No. 778,059. PATENTED DEC. 20, 1904.
J. DE MINISZEWSKI.
MACHINE FOR CUTTING DIAMONDS.
APPLICATION FILED MAR. 19, 1903.
NO MODEL. 2 SHEETS—SHEET 1.

WITNESSES:
W. M. Avery
C. R. Ferguson

INVENTOR
Joseph de Miniszewski
BY
ATTORNEYS

No. 778,059. PATENTED DEC. 20, 1904.
J. DE MINISZEWSKI.
MACHINE FOR CUTTING DIAMONDS.
APPLICATION FILED MAR. 19, 1903.
NO MODEL. 2 SHEETS—SHEET 2.
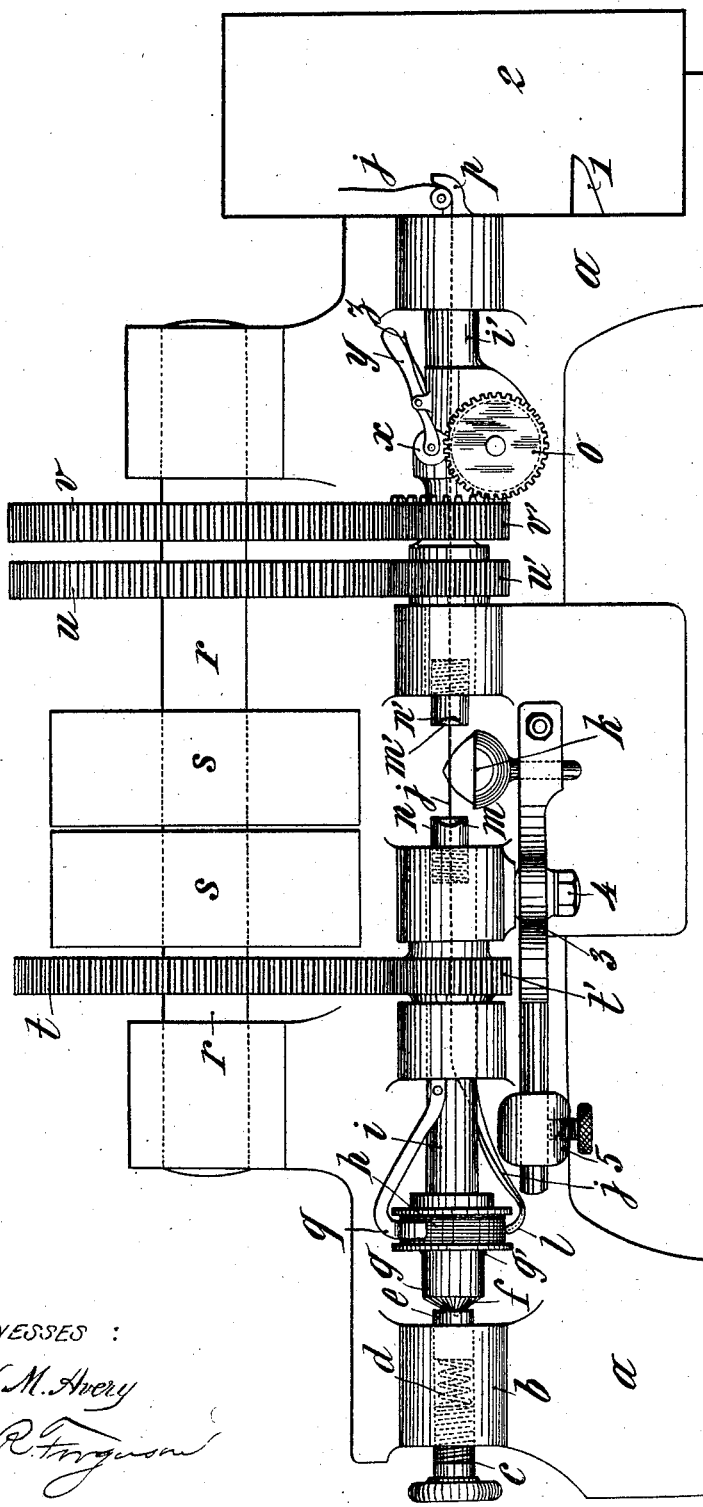
WITNESSES:
W. M. Avery
C. R. Ferguson
INVENTOR
Joseph de Miniszewski
BY
Munn
ATTORNEYS.

No. 778,059. Patented December 20, 1904.

UNITED STATES PATENT OFFICE.

JOSEPH DE MINISZEWSKI, OF KWASOW, RUSSIA, ASSIGNOR TO INOCENCIO FERNANDEZ, OF STANTULLANO, SPAIN.

MACHINE FOR CUTTING DIAMONDS.

SPECIFICATION forming part of Letters Patent No. 778,059, dated December 20, 1904.

Application filed March 19, 1903. Serial No. 148,551.

*To all whom it may concern:*

Be it known that I, JOSEPH DE MINISZEWSKI, engineer, of Kwasow, district of Stopnica, Kielce, Russia, have invented an Improved Machine for Cutting Diamonds, of which the following is a full, clear, and exact description.

This invention relates to a new or improved machine for cutting diamonds and other hard substances by means of a steel wire turning about itself and coated with a hard material diluted in a suitable fluid, a very slow translating motion being at same time imparted to this wire.

Reference is to be had to the accompanying drawings, in which—

Figure 1:
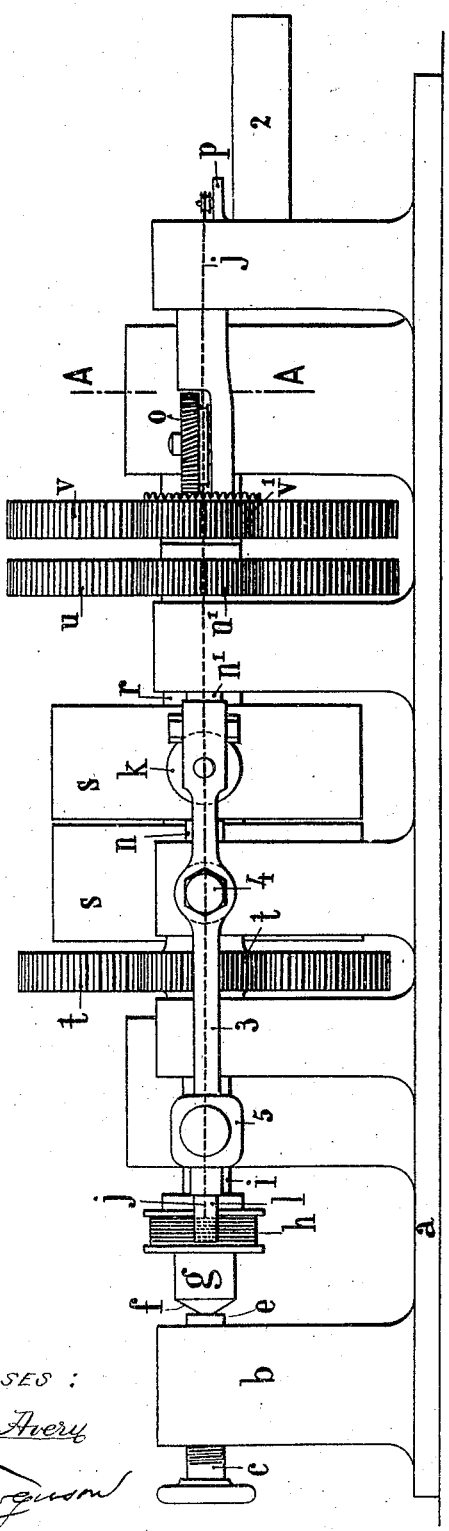
Figure 3:
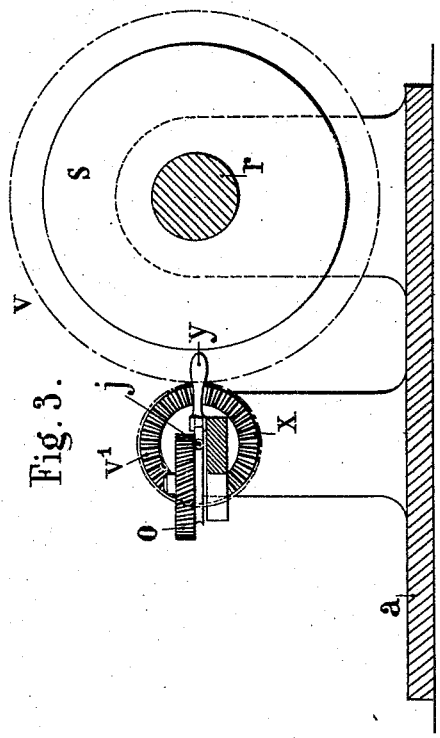

Figure 1 is an elevation of a diamond-cutting machine embodying my invention. Fig. 2 is a plan thereof, and Fig. 3 is a section on the line A A of Fig. 1.

As shown in the drawings, a frame $a$ carries a support $b$, in which a screw $c$ abuts against a spiral spring $d$, pressing a cylindrical part $e$. The part $e$ receives centrally a point $f$, which is made hollow in order to form a kind of cap $g$, the edges $g'$ of which form a brake acting upon a spool $h$, loosely mounted upon a spindle $i$. The spool $h$ receives the wire $j$ intended to cut the diamond, placed as shown in $k$. For this purpose this wire, maintained by a support $l$, passes through the spindle $i$, which is made hollow to this effect and comes out through a hole made through a jewel $m$, enchased in a support $n$. This wire after coming into contact with the diamond to be cut passes through another ruby or diamond $m'$, enchased within a support $n'$, reaches a stretcher $o$, where it makes two turns, then passes into the shaft $i''$, and finally comes out through the end of the machine. The wire on the spool $h$ is maintained by means of a brake $q$, acting as a spring and connected with the spindle $i$ in order to prevent the wire from unwinding from the spool in case this wire would break. Another spindle $r$ is arranged parallelly with the spindle $i$ and is provided with pulleys $s$ for the transmission-shaft and with gears $t$ $u$ $v$. The gear $t$ meshes with a pinion $t'$, which causes the spindle $i$ to turn. The gear $u$ meshes with a pinion $u'$, which causes the spindle $i'$ to turn. The spindles $i$ and $i'$ rotate at the same speed. These gears impart a very fast rotary motion to the wire. Finally, the gear $v$ operates a pinion $v'$, loosely mounted upon the spindle $i'$ and slowly operating the stretcher $o$ in order to give the wire a very slow longitudinal translating motion. The wire $j$ is applied to the stretcher $o$ by means of a sort of roller $x$, pivoted at the end of a handle $y$, provided with a spring $z$, which constantly presses the roller $x$ against the wire.

The wire $j$ on coming out is cut on a knife 1, and the ends of this wire fall into a receptacle 2.

The diamond $k$ is maintained at the end of a support 3, pivoted at 4 and provided with a counterweight 5. As the cut of the diamond proceeds the counterweight 5 provides for the displacement of the diamond by causing the support 3 to pivot around its joint 4, so that the diamond will always be in contact with the cutting-wire.

The forms, details, accessories, materials, and sizes of this machine may of course vary without departing from the principle of this invention.

I claim—

1. A gem-cutting machine comprising a spool, a wire wound on the spool, means for drawing the wire from the spool, and means for rotating the wire.

2. A gem-cutting machine comprising rotary tubular spindles, means for rotating the spindles, a wire rotating with the spindles, and means for moving the wire lengthwise through the spindles.

3. A gem-cutting machine comprising rotary tubular spindles, spaced apart, a gem-holder between the spindles, a wire extended through the spindles, and rotating therewith, and means for moving the wire lengthwise.

4. In a machine for cutting gems, a wire, a spool, from which the wire extends, a stretcher for drawing the wire from the spool, and means for rotating the wire.

5. In a diamond-cutting machine, tubular rotary spindles spaced apart, perforated stones in the adjacent ends of said spindles, a wire movable through said spindles and stones and rotating therewith, and means for rotating the spindles and wire.

6. In a diamond-cutting machine, tubular rotary spindles spaced apart, perforated gems arranged in the adjacent ends of said spindles, a spool, a wire extended from said spool through the spindles and gems and rotating therewith, means for drawing the wire through the spindles and gems, and a swinging gem-support between the spindles.

The foregoing specification of my improved machine for cutting diamonds signed by me this 28th day of February, 1903.

JOSEPH DE MINISZEWSKI.

Witnesses:
J. ALLISON BOWEN,
MAURICE H. PIGNET.